(No Model.)
F. F. RAYMOND, 2d.
FASTENER FOR GLOVES.
No. 583,084.
2 Sheets—Sheet 1.
Patented May 25, 1897.
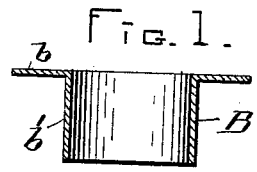
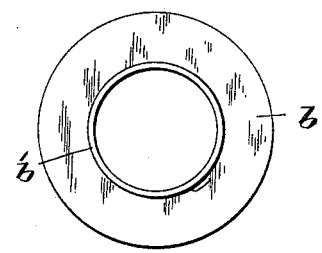
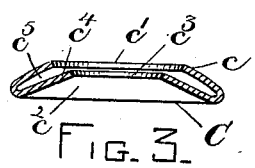
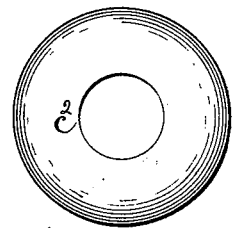
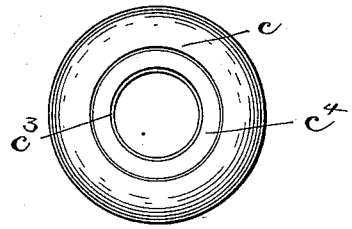
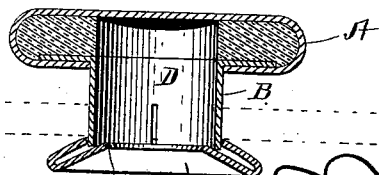
WITNESSES.
J. M. Dolan
M. Lynch
INVENTOR
F. F. Raymond (No Model.) 2 Sheets—Sheet 2.
F. F. RAYMOND, 2d.
FASTENER FOR GLOVES.
No. 583,084. Patented May 25, 1897.
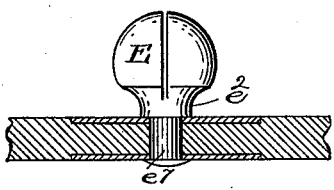
Fig. 7.
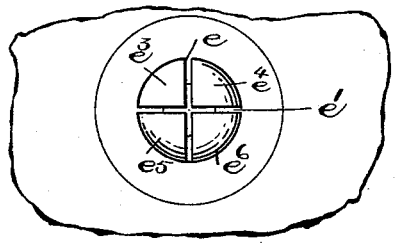
Fig. 8.
Fig. 9.
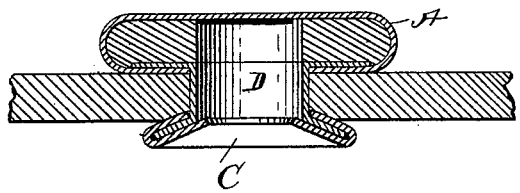
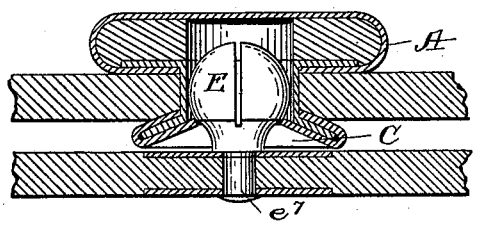
Fig. 10.
Fig. 11.
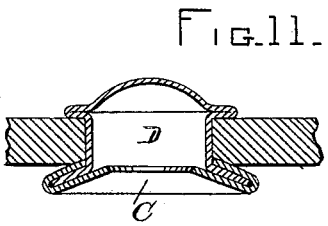
WITNESSES.
J. M. Dolan
M. Lynch
INVENTOR.
F. F. Raymond 2d
THE NORRIS PETERS CO., PHOTO-LITHO., WASHINGTON, D. C.

UNITED STATES PATENT OFFICE.

FREEBORN F. RAYMOND, 2D, OF NEWTON, MASSACHUSETTS.

FASTENER FOR GLOVES.

SPECIFICATION forming part of Letters Patent No. 583,084, dated May 25, 1897.

Application filed December 21, 1891. Serial No. 415,797. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Fasteners for Gloves and other Articles, of which the following is a full, clear, and exact description, reference being had to the accompanying drawings, forming a part of this specification, in explaining its nature.

The invention relates to a fastener for gloves and other articles of two members, one of which is known as the "socket" member and the other the "ball" member. The socket member is made up of a cap, a flange tubular fastening or eyelet, and a turning washer, the edge of which extends beyond the inner surface of the barrel of the tubular fastening and forms an entrance to the socket, which is adapted to be used with a yielding or contractible ball member of a fastener.

Referring to the drawings, Figures 1 and 2 show in section and inverted plan the flange tubular fastening. Figs. 3, 4, and 5 represent in section plan and inverted plan the turning washer. Fig. 6 shows the parts of the socket member before they are secured together. Figs. 7 and 8 show in elevation and plan the ball member of the fastener. Fig. 9 represents the socket member of the fastener secured to the glove flap or material. Fig. 10 represents the two members of the fastener together. Fig. 11 is a representation of a modified form of the socket member of the fastener.

A is the cap. Its edge $a$ is folded or otherwise brought on the under surface of the flange $b$ of the flange tubular fastening B. This fastening has also the tubular section or barrel $b'$.

C is the turning washer. It is formed with the upper section or plate $c$, in which is a hole $c'$, and the lower section or plate, in which is a hole $c^3$. The hole $c^3$ is concentric with the hole $c'$, but smaller. The upper surface $c^4$ of the plate $c^2$ is preferably slightly inclined, and there is a pocket or space $c^5$ between the two plates.

In the act of assembling two parts of the socket member a hole is formed in the glove flap or material. The barrel of the tubular fastening passes through it and its lower edge caused to strike the inclined surface $c^4$ and turn into the pocket $c^5$. (See Fig. 9.) This brings the hole $c^3$ at the mouth of the socket D, the edge $c^6$ of the washer extending beyond the inner surface of the barrel $b'$, and thereby contracting the opening to it. The ball E is contractible—that is, it is adapted to be reduced in size somewhat and then to yield or open automatically. Any ball member having this feature may be used. The one shown is formed from a slitted ball by means of the cross recesses or slits $e\ e'$, which extend to or very nearly to the neck $e^2$ of the ball and divide into the four parts $e^3\ e^4\ e^5\ e^6$. The fastener also has a shank $e^7$ of sufficient length to extend through the material to which the ball member is secured and the upper and under washers placed thereon, and it is headed upon the under surface of the under washer. (See Figs. 7 and 8.)

In Fig. 11 I have shown the cap of the tubular extension as made integral.

In use the expansible ball is inserted into the opening $c^3$ to the socket somewhat contracted by being forced through said opening and then expanded in the socket or chamber beyond.

Having thus fully described my invention, I claim and desire to secure by Letters Patent of the United States—

In a fastener for gloves and other articles, the combination of a resilient ball member with a socket member comprising an eyelet having at one end a flange adapted to bear upon one surface of the material, and at the other end a socket-piece C formed of two plates $c$, $c^2$, united at their outer edge, providing a space $c^5$ secured to the outer edge of the barrel of the eyelet upon the surface of the material opposite that upon which the flange of the eyelet bears by the turning of the edge of said barrel, into said piece $c^5$ between the two plates, the edge of the lower plate about the hole $c^3$ extending inwardly beyond the wall of the eyelet and forming an inextensible entrance thereto, as and for the purposes described.

FREEBORN F. RAYMOND, 2D.

Witnesses:
J. M. DOLAN,
K. T. BUTLER.